US011184934B2

United States Patent
Huang-Fu

(10) Patent No.: US 11,184,934 B2
(45) Date of Patent: Nov. 23, 2021

(54) AT-COMMAND FOR ALWAYS-ON PDU SESSION

(71) Applicant: MediaTek Inc., Hsinchu (TW)

(72) Inventor: Chien-Chun Huang-Fu, Hsinchu (TW)

(73) Assignee: MediaTek Inc.

( * ) Notice: Subject to any disclaimer, the term of this patent is extended or adjusted under 35 U.S.C. 154(b) by 82 days.

(21) Appl. No.: 16/593,490

(22) Filed: Oct. 4, 2019

(65) Prior Publication Data

US 2020/0113002 A1     Apr. 9, 2020

Related U.S. Application Data

(60) Provisional application No. 62/742,325, filed on Oct. 6, 2018.

(51) Int. Cl.
| | | |
|---|---|---|
| *H04W 76/10* | (2018.01) | |
| *H04W 76/11* | (2018.01) | |
| *H04W 76/36* | (2018.01) | |
| *H04W 76/18* | (2018.01) | |
| *H04W 76/30* | (2018.01) | |
| *H04W 8/30* | (2009.01) | |
| *H04W 28/04* | (2009.01) | |

(Continued)

(52) U.S. Cl.
CPC .............. *H04W 76/11* (2018.02); *H04W 8/30* (2013.01); *H04W 12/06* (2013.01); *H04W 28/04* (2013.01); *H04W 76/10* (2018.02); *H04W 76/18* (2018.02); *H04W 76/30* (2018.02); *H04W 76/36* (2018.02); *H04W 80/02* (2013.01); *H04W 80/10* (2013.01); *H04W 80/12* (2013.01)

(58) Field of Classification Search
None
See application file for complete search history.

(56) References Cited

U.S. PATENT DOCUMENTS 10,142,251 B2 * 11/2018 Huang-Fu ............. H04L 45/121
10,477,601 B2 * 11/2019 Addepalli ......... H04W 36/0016
(Continued)

FOREIGN PATENT DOCUMENTS

| CN | 107690161 A | 2/2018 |
| WO | WO 2014027108 A2 | 2/2014 |
| WO | WO 2017200562 A1 | 11/2017 |

OTHER PUBLICATIONS

China National Intellectual Property Administration, International Search Report and Written Opinion for PCT/CN2019/109911, dated Jan. 14, 2020.

(Continued)

*Primary Examiner* — Tri H Phan
(74) *Attorney, Agent, or Firm* — Han IP PLLC; Andy M. Han

(57) ABSTRACT

Various examples and schemes pertaining to an AT-command for an always-on PDU session in mobile communications are described. A processor of an apparatus implemented as a user equipment (UE) establishes a protocol data unit (PDU) session between a modem of the apparatus and a network node of a wireless network in response to a trigger by an application executed on the processor. The processor forwards a query from the application to the modem for an indication provided by the network node on whether the established PDU session is an always-on PDU session. The processor then receives the indication provided by the network node from the modem.

20 Claims, 4 Drawing Sheets

(51) Int. Cl.
*H04W 80/02* (2009.01)
*H04W 12/06* (2021.01)
*H04W 80/10* (2009.01)
*H04W 80/12* (2009.01)

(56) References Cited

U.S. PATENT DOCUMENTS

| | | | |
|---|---|---|---|
| 10,708,190 B2 * | 7/2020 | Huang-Fu | H04L 69/166 |
| 10,911,979 B2 * | 2/2021 | Huang-Fu | H04W 28/0268 |
| 10,952,094 B2 * | 3/2021 | Huang-Fu | H04W 28/0273 |
| 2018/0160461 A1 | 6/2018 | Addepalli et al. | |
| 2021/0022099 A1 * | 1/2021 | Kumar | H04W 68/005 |
| 2021/0076444 A1 * | 3/2021 | Shu | H04W 8/08 |
| 2021/0204357 A1 * | 7/2021 | Tang | H04W 76/34 |

OTHER PUBLICATIONS

3GPP, 3rd Generation Partnership Project; Technical Specification Group Core Network and Terminals; Non-Access-Stratum (NAS) protocol for 5G System (5GS); Stage 3 (Release 15), 3GPP TS 24.501 v15.1.0, Sep. 2018.

Taiwan Intellectual Property Office, Office Action for Taiwan Patent Application No. 108136183, dated May 8, 2020.

* cited by examiner

| Command | Possible response(s) |
|---|---|
| +CGCONTRDP[=<cid>] | [+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>[,<Local_Addr_Ind>[,<Non-IP_MTU>[,<Serving_PLMN_rate_control_value>[,<Reliable_Data_Service>[,<PS_Data_Off_Support>[,<PDU_session_id>,<QFI>[,<SSC_mode>[,<S-NSSAI>[,<Access_type>[,<RQ_timer>[,<Always-on_ind>]]]]]]]]]]]]]]]]]]]]]<br><br>[<CR><LF>+CGCONTRDP: ...<br>[...]] |

FIG. 1

AT-COMMAND FOR ALWAYS-ON PDU SESSION

CROSS REFERENCE TO RELATED PATENT APPLICATION(S)

The present disclosure is part of a non-provisional application claiming the priority benefit of U.S. Patent Application No. 62/742,325, filed on 6 Oct. 2018, the content of which being incorporated by reference in its entirety.

TECHNICAL FIELD

The present disclosure is generally related to mobile communications and, more particularly, to an AT-command for an always-on protocol data unit (PDU) session in mobile communications.

BACKGROUND

Unless otherwise indicated herein, approaches described in this section are not prior art to the claims listed below and are not admitted as prior art by inclusion in this section.

AT commands are instructions used to control a modem, such as a modem used in mobile communications (e.g., a 4th Generation (4G) Long-Term Evolution (LTE) modem or a 5th Generation (5G) New Radio (NR) modem). In general, there are two types of AT commands, namely basic commands and extended commands. Basic commands are AT commands that do not start with "+" such as, for example, D (dial), A (answer), H (hook control) and 0 (return to online data state). Extended commands are AT commands that start with "+". For example, +CGCONTRDR is an AT command that returns active packet data protocol (PDP) parameters such as access point name (APN), internet protocol (IP) address, subnet mark, gateway address, primary and secondary dynamic domain system (DNS) addresses, and so on.

In the 4G Evolved Packet System (EPS), when a user equipment (UE) returns to a connected state from an idle state, all connections and resources (e.g., EPS bearers and user plane (UP) resources) need to be set up. If not (e.g., a data radio bear (DRB) under a given EPS bearer not having been set up), the UE would need to locally release such EPS bearer. In 5G, to avoid large overhead burden when a UE returns to the connected mode from the idle mode, it has been agreed in the $3^{rd}$ Generation Partnership Project (3GPP) that not every protocol data unit (PDU) session needs to be activated especially since not all PDU sessions might be in use. Thus, in 5G, when a UE returns to the connected mode from the idle mode, activation of PDU sessions can be selectively performed (i.e., with some but not all PDU sessions being activated).

For some latency-sensitive types of services, such as ultra-reliable low-latency communication (URLLC), the respective PDU sessions established for such latency-sensitive services would need to be activated whenever needs for such services arise. However, given that certain activation procedures on the UE side tend to conflict with certain activation procedures on the network side, a compromise has been reached in 3GPP that certain PDU sessions are set up as always-on PDU sessions. That is, whenever the UE switches from the idle mode to the connected mode, the UE needs to allocate or establish user plane (UP) resources for an always-on PDU session. Currently, when a network receives a request from a UE to set up a given PDU session as an always-on PDU session, the network determines whether or not the PDU session in concern should be set up as an always-on PDU session. However, it has not been defined on how to return the decision of the network whether a given PDU session is established as an always-on PDU session to an upper layer of the protocol stack in the UE.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method implementable in an apparatus as a UE may involve a processor of the apparatus establishing a PDU session between a modem of the apparatus and a network node of a wireless network responsive to a trigger by an application executed on the processor. The method may also involve the processor forwarding a query from the application to the modem for an indication provided by the network node on whether the established PDU session is an always-on PDU session. The method may further involve the processor receiving the indication provided by the network node from the modem.

In one aspect, a method implementable in an apparatus as a UE may involve a processor of the apparatus receiving a PDU session establishment accept message from a network node of a wireless network during establishing of a PDU session between the UE and the network node. The method may also involve the processor forwarding to an application executed on the processor an indication provided by the network node on whether the PDU session is an always-on PDU session.

In one aspect, an apparatus may include a modem and a processor coupled to the modem. The modem may be configured to wirelessly communicate with a network node of a wireless network. The processor may be configured to establish a PDU session between the modem and the network node responsive to a trigger by an application executed on the processor. The processor may be also configured to forward a query from the application to the modem for an indication provided by the network node on whether the established PDU session is an always-on PDU session. The processor may be further configured to receive the indication provided by the network node from the modem.

It is noteworthy that, although description provided herein may be in the context of certain radio access technologies, networks and network topologies such as 5G and NR, the proposed concepts, schemes and any variation(s)/derivative(s) thereof may be implemented in, for and by other types of radio access technologies, networks and network topologies such as, for example and without limitation, LTE, LTE-Advanced, LTE-Advanced Pro, narrowband (NB), narrowband Internet of Things (NB-IoT), and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram of an example AT command in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to an AT-command for an always-on PDU session in mobile communications. According to the present disclosure, a number of possible solutions may be implemented separately or jointly. That is, although these possible solutions may be described below separately, two or more of these possible solutions may be implemented in one combination or another.

FIG. 1 illustrates an example AT command 100 in accordance with an implementation of the present disclosure. Referring to FIG. 1, under a proposed scheme in accordance with an implementation of the present disclosure, AT command 100 may be the AT command +CGCONTRDP, which is used to show dynamically allocated 5GS PDU session parameters. The AT command +CGCONTRDP is extended to include a new parameter <Always-on_ind> to indicate whether a PDU session in concern is deemed as be an always-on PDU session by a network. For instance, the parameter <Always-on_ind> may be of an integer type, with a value of "0" indicating that the PDU session in concern is not an always-on PDU session and a value of "1" indicating that the PDU session in concern is an always-on PDU session. An application (or a higher layer in the protocol stack) may query a modem of a UE by using AT command 100 +CGCONTRDP and, in response, receive from the modem an indication provided by a network node of a wireless network on whether the PDU session in concern is an always-on PDU session. Under the proposed scheme, such indication may be represented by the value of the parameter <Always-on_ind>.

Illustrative Implementations

Figure 2:
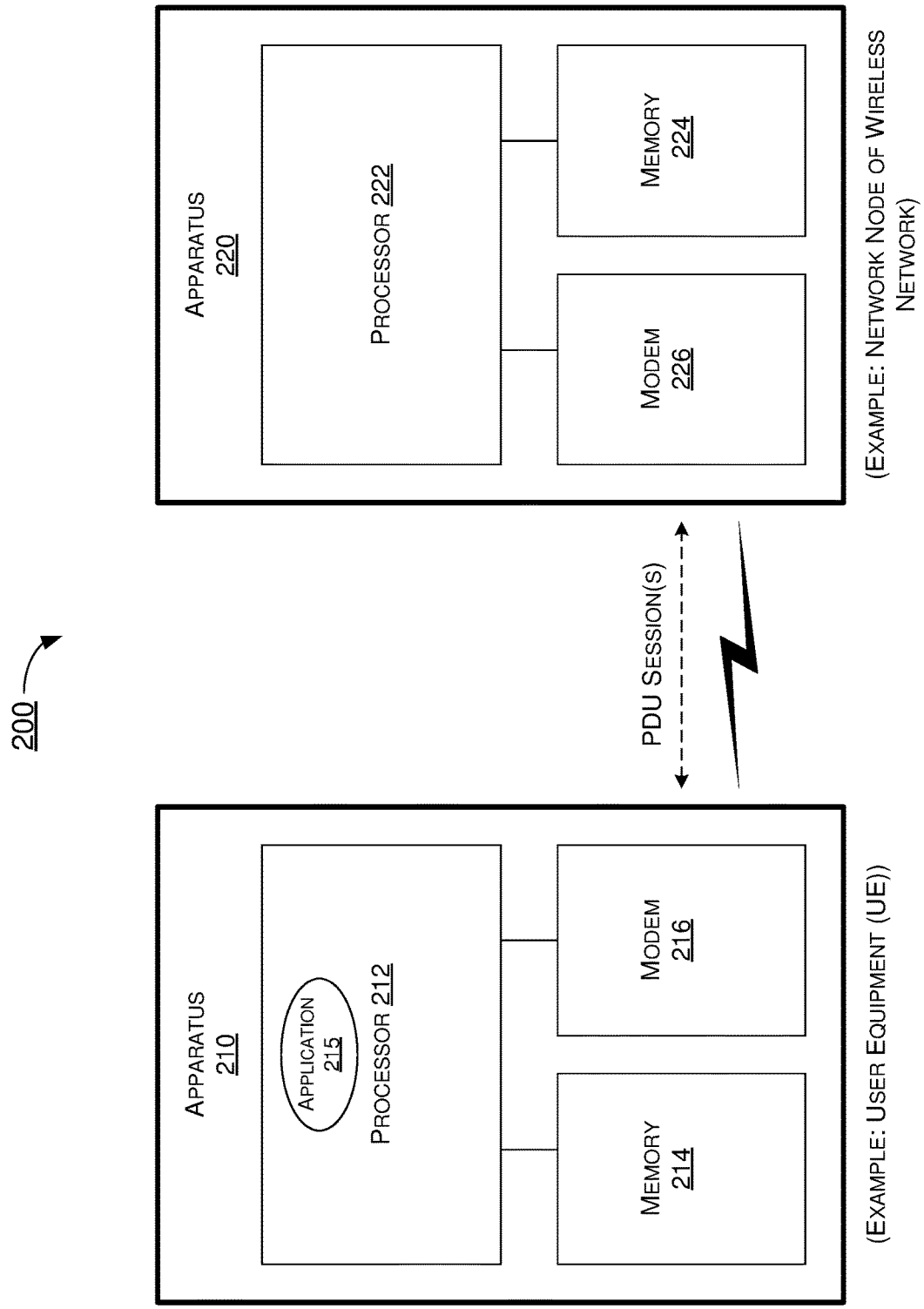
FIG. 2 is a block diagram of an example communication system in accordance with an implementation of the present disclosure.

FIG. 2 illustrates an example communication system 200 having an example apparatus 210 and an example apparatus 220 in accordance with an implementation of the present disclosure. Each of apparatus 210 and apparatus 220 may perform various functions to implement schemes, techniques, processes and methods described herein pertaining to an AT-command for an always-on PDU session, including various schemes described above as well as process 400 described below.

Each of apparatus 210 and apparatus 220 may be a part of an electronic apparatus, which may be a UE such as a portable or mobile apparatus, a wearable apparatus, a wireless communication apparatus or a computing apparatus. For instance, each of apparatus 210 and apparatus 220 may be implemented in a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a network node or base station (e.g., eNB, gNB or TRP), a small cell, a router or a gateway. For instance, at least one of apparatus 210 and apparatus 220 may be implemented in an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, or one or more CISC or RISC processors.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including an AT-command for an always-on PDU session in mobile communications in accordance with various implementations of the present disclosure.

In some implementations, apparatus 210 may also include a modem 216, as a communication device, coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a modem 226, as a communication device, coupled to processor 222 and capable of wirelessly transmitting and receiving data. In some implementations, apparatus 220 may further include a memory 224 coupled to processor 222 and capable of being accessed by processor 222 and storing data therein. Accordingly, apparatus 210 and apparatus 220 may wirelessly communicate with each other via modem 216 and modem 226, respectively.

To aid better understanding, the following description of the operations, functionalities and capabilities of each of apparatus 210 and apparatus 220 is provided in the context of an NR communication environment in which apparatus 210 is implemented in or as a wireless communication device, a communication apparatus or a UE and apparatus 220 is implemented in or as a network node of a wireless network (e.g., 5G NR mobile network).

In one aspect of an AT-command for an always-on PDU session in accordance with the present disclosure, processor 212 of apparatus 210, implemented in or as a UE, may start or otherwise establish an always-on PDU session between modem 216 of apparatus 210 and apparatus 220, implemented in or as a network node of a wireless network, in response to a trigger by an application 215 executed on processor 212. The PDU session establishment between apparatus 210 and apparatus 220 may include the following procedures: (1) processor 212 of apparatus 210 requests modem 216 to establish a PDU session via an AT command +CGDCONT; (2) modem 216 of apparatus 210 sends out a 5GSM message including PDU session establishment request to apparatus 220, as a network node of a wireless network; (3) in response to the PDU session establishment request, apparatus 220 accepts the request by sending a 5GSM message including a PDU session establishment accept to modem 216 of apparatus 210; and (4) modem 216 of apparatus 210 replies to processor 212 of apparatus 210 that the establishment is complete via an AT command +CGEV.

Additionally, processor 212 may forward a query from application 215 to modem 216 for an indication provided by apparatus 220 on whether the established PDU session is an always-on PDU session. Moreover, processor 212 may receive the indication provided by apparatus 220 from modem 216.

In some implementations, in forwarding the query to modem 216, processor 212 may forward an AT command +CGCONTRDP to modem 216.

In some implementations, in receiving the indication provided by apparatus 220 from modem 216, processor 212 may receive from modem 216 a plurality of parameters in response to the AT command +CGCONTRDP. In such cases, one of the plurality of parameters may indicate whether the established PDU session is or is not an always-on PDU session as indicated by apparatus 220.

In some implementations, the one of the plurality of parameters may include <Always-on_ind>, as shown in FIG. 1.

In some implementations, a value of 0 for the one of the plurality of parameters may indicate that the established PDU session is not an always-on PDU session, and a value of 1 for the one of the plurality of parameters may indicate that the established PDU session is an always-on PDU session.

In some implementations, in establishing the PDU session, processor 212 may establish the PDU session in response to apparatus 210 switching from an idle mode to a connected mode.

In some implementations processor 212 may perform additional operations. For instance, processor 212 may activate one or more use plane (UP) resources for the established PDU session in response to the received indication provided by apparatus 220 indicating the established PDU session as an always-on PDU session when apparatus 210 switches from an idle mode to a connected mode.

In another aspect of an AT-command for an always-on PDU session in accordance with the present disclosure, processor 212 of apparatus 210, implemented in or as a UE, may receive a PDU session establishment accept message from apparatus 220, implemented in or as a network node of a wireless network, during establishing of a PDU session between apparatus 210 and apparatus 220. Furthermore, processor 212 may forward to an application 215 executed on processor 212 an indication provided by apparatus 220 on whether the PDU session is an always-on PDU session.

In some implementations, in forwarding the indication provided by apparatus 220 on whether the PDU session is an always-on PDU session, processor 212 may perform certain operations. For instance, processor 212 may forward a query from application 215 to modem 216 for the indication provided by apparatus 220 on whether the PDU session is an always-on PDU session. Moreover, processor 212 may receive the indication provided by apparatus 220 from modem 216.

In some implementations, in forwarding the query to modem 216, processor 212 may forward an AT command +CGCONTRDP to modem 216.

In some implementations, in receiving the indication provided by apparatus 220 from modem 216, processor 212 may receive from modem 216 a parameter in response to the AT command +CGCONTRDP. In such cases, the parameter may indicate whether the PDU session is or is not an always-on PDU session as indicated by apparatus 220.

In some implementations, the parameter may include <Always-on_ind>, as shown in FIG. 1.

In some implementations, a value of 0 for the parameter may indicate that the established PDU session is not an always-on PDU session, and a value of 1 for the parameter may indicate that the established PDU session is an always-on PDU session.

In some implementations, in receiving the PDU session establishment accept message from apparatus 220, processor 212 may perform certain operations. For instance, processor 212 may establish the PDU session responsive to apparatus 210 switching from an idle mode to a connected mode. Additionally, processor 212 may transmit a PDU session establishment request to apparatus 220. Moreover, processor 212 may receive the PDU session establishment accept message responsive to the transmitting.

In some implementations, processor 212 may perform additional operations. For instance, processor 212 may activate one or more UP resources for the established PDU session in response to the received indication provided by apparatus 220 indicating the established PDU session as an always-on PDU session when switching from an idle mode to a connected mode.

Illustrative Processes

Figure 3:
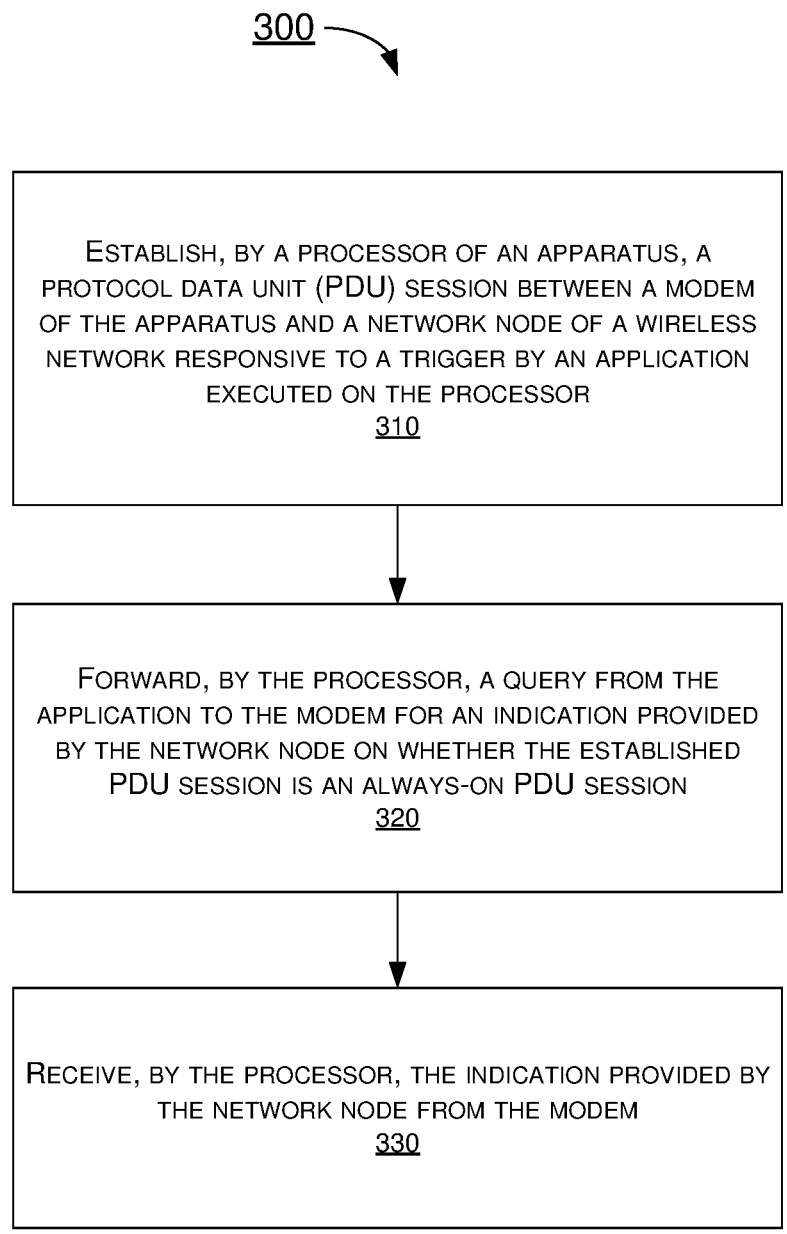
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to an AT-command for an always-on PDU session in accordance with the present disclosure. Process 300 may represent an aspect of implementation of features of apparatus 210 and apparatus 220. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may be executed in the order shown in FIG. 3 or, alternatively, in a different order. Process 300 may also be repeated partially or entirely. Process 300 may be implemented by apparatus 210, apparatus 220 and/or any suitable wireless communication device, UE, base station or machine type devices. Solely for illustrative purposes and without limitation, process 300 is described below in the context of apparatus 210 in or as a UE and apparatus 220 in or as a network node of a wireless network (e.g., 5G NR mobile network). Process 300 may begin at block 310.

At 310, process 300 may involve processor 212 of apparatus 210, implemented in or as a UE, establishing a PDU session between modem 216 of apparatus 210 and apparatus 220, implemented in or as a network node of a wireless network, in response to a trigger by an application 215 executed on processor 212. Process 300 may proceed from 310 to 320.

At 320, process 300 may involve processor 212 forwarding a query from application 215 to modem 216 for an indication provided by apparatus 220 on whether the established PDU session is an always-on PDU session. Process 300 may proceed from 320 to 330.

At 330, process 300 may involve processor 212 receiving the indication provided by apparatus 220 from modem 216.

In some implementations, in forwarding the query to modem 216, process 300 may involve processor 212 forwarding an AT command +CGCONTRDP to modem 216.

In some implementations, in receiving the indication provided by apparatus 220 from modem 216, process 300 may involve processor 212 receiving from modem 216 a plurality of parameters in response to the AT command +CGCONTRDP. In such cases, one of the plurality of parameters may indicate whether the established PDU session is or is not an always-on PDU session as indicated by apparatus 220.

In some implementations, the one of the plurality of parameters may include <Always-on_ind>, as shown in FIG. 1.

In some implementations, a value of 0 for the one of the plurality of parameters may indicate that the established PDU session is not an always-on PDU session, and a value of 1 for the one of the plurality of parameters may indicate that the established PDU session is an always-on PDU session.

In some implementations, in establishing the PDU session, process 300 may involve processor 212 establishing the PDU session in response to apparatus 210 switching from an idle mode to a connected mode.

In some implementations, process 300 may involve processor 212 performing additional operations. For instance, process 300 may involve processor 212 activating one or more use plane (UP) resources for the established PDU session in response to the received indication provided by apparatus 220 indicating the established PDU session as an always-on PDU session when switching from an idle mode to a connected mode.

Figure 4:
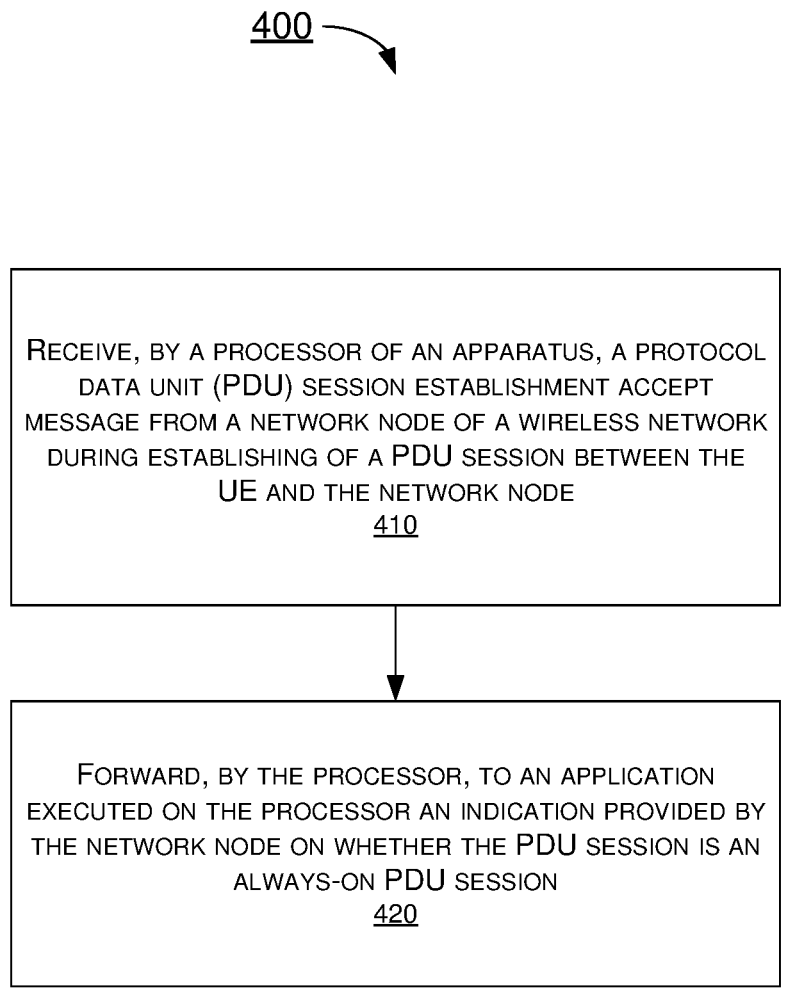
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to an AT-command for an always-on PDU session in accordance with the present disclosure. Process 400 may represent an aspect of implementation of features of apparatus 210 and apparatus 220. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 210, apparatus 220 and/or any suitable wireless communication device, UE, base station or machine type devices. Solely for illustrative purposes and without limitation, process 400 is described below in the context of apparatus 210 in or as a UE and apparatus 220 in or as a network node of a wireless network (e.g., 5G NR mobile network). Process 400 may begin at block 410.

At 410, process 400 may involve processor 212 of apparatus 210, implemented in or as a UE, receiving a PDU session establishment accept message from apparatus 220, implemented in or as a network node of a wireless network, during establishing of a PDU session between apparatus 210 and apparatus 220. Process 400 may proceed from 410 to 420.

At 420, process 400 may involve processor 212 forwarding to an application 215 executed on processor 212 an indication provided by apparatus 220 on whether the PDU session is an always-on PDU session.

In some implementations, in forwarding the indication provided by apparatus 220 on whether the PDU session is an always-on PDU session, process 400 may involve processor 212 performing certain operations. For instance, process 400 may involve processor 212 forwarding a query from application 215 to modem 216 for the indication provided by apparatus 220 on whether the PDU session is an always-on PDU session. Moreover, process 400 may involve processor 212 receiving the indication provided by apparatus 220 from modem 216.

In some implementations, in forwarding the query to modem 216, process 400 may involve processor 212 forwarding an AT command +CGCONTRDP to modem 216.

In some implementations, in receiving the indication provided by apparatus 220 from modem 216, process 400 may involve processor 212 receiving from modem 216 a parameter in response to the AT command +CGCONTRDP. In such cases, the parameter may indicate whether the PDU session is or is not an always-on PDU session as indicated by apparatus 220.

In some implementations, the parameter may include <Always-on_ind>, as shown in FIG. 1.

In some implementations, a value of 0 for the parameter may indicate that the established PDU session is not an always-on PDU session, and a value of 1 for the parameter may indicate that the established PDU session is an always-on PDU session.

In some implementations, in receiving the PDU session establishment accept message from apparatus 220, process 400 may involve processor 212 performing certain operations. For instance, process 400 may involve processor 212 establishing the PDU session responsive to apparatus 210 switching from an idle mode to a connected mode. Additionally, process 400 may involve processor 212 transmitting a PDU session establishment request to apparatus 220. Moreover, process 400 may involve processor 212 receiving the PDU session establishment accept message responsive to the transmitting.

In some implementations, process 400 may involve processor 212 performing additional operations. For instance, process 400 may involve processor 212 activating one or more use plane (UP) resources for the established PDU session in response to the received indication provided by apparatus 220 indicating the established PDU session as an always-on PDU session when switching from an idle mode to a connected mode.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implemented in an apparatus as a user equipment (UE), comprising:
    establishing, by a processor of the apparatus, a protocol data unit (PDU) session between a modem of the apparatus and a network node of a wireless network responsive to a trigger by an application executed on the processor;
    forwarding, by the processor, a query from the application to the modem for an indication provided by the network node on whether the established PDU session is an always-on PDU session; and
    receiving, by the processor, the indication provided by the network node from the modem indicating whether or not the established PDU session is an always-on PDU session.

2. The method of claim 1, wherein the forwarding of the query to the modem comprises forwarding an AT command +CGCONTRDP to the modem.

3. The method of claim 2, wherein the receiving of the indication provided by the network node from the modem comprises receiving from the modem a plurality of parameters in response to the AT command +CGCONTRDP, and wherein one of the plurality of parameters indicates whether the established PDU session is or is not an always-on PDU session as indicated by the network node.

4. The method of claim 3, wherein the one of the plurality of parameters comprises <Always-on_ind>, wherein a value of 0 for the parameter indicates that the established PDU session is not an always-on PDU session, and wherein a value of 1 for the one of the plurality of parameters indicates that the established PDU session is an always-on PDU session.

5. The method of claim 1, wherein the establishing of the PDU session comprises establishing the PDU session responsive to the UE switching from an idle mode to a connected mode.

6. The method of claim 1, further comprising:
activating, by the processor, one or more user plane (UP) resources for the established PDU session responsive to the received indication provided by the network node indicating the established PDU session as an always-on PDU session when switching from an idle mode to a connected mode.

7. A method implementable in an apparatus as a user equipment (UE), comprising:
receiving, by a processor of the apparatus, a protocol data unit (PDU) session establishment accept message from a network node of a wireless network during establishing of a PDU session between the UE and the network node; and
forwarding, by the processor, to an application executed on the processor an indication provided by the network node on whether the PDU session is an always-on PDU session as a result of querying the network node whether or not the PDU session is an always-on PDU.

8. The method of claim 7, wherein the forwarding of the indication provided by the network node on whether the PDU session is an always-on PDU session comprises:
forwarding, by the processor, a query from the application to a modem of the apparatus for the indication provided by the network node on whether the PDU session is an always-on PDU session; and
receiving, by the processor, the indication provided by the network node from the modem.

9. The method of claim 8, wherein the forwarding of the query to the modem comprises forwarding an AT command +CGCONTRDP to the modem.

10. The method of claim 9, wherein the receiving of the indication provided by the network node from the modem comprises receiving from the modem a parameter in response to the AT command +CGCONTRDP, and wherein the parameter indicates whether the PDU session is or is not an always-on PDU session as indicated by the network node.

11. The method of claim 10, wherein the parameter comprises <Always-on_ind>, wherein a value of 0 for the parameter indicates that the established PDU session is not an always-on PDU session, and wherein a value of 1 for the parameter indicates that the established PDU session is an always-on PDU session.

12. The method of claim 7, wherein the receiving of the PDU session establishment accept message from the network node comprises:
establishing the PDU session responsive to the UE switching from an idle mode to a connected mode;
transmitting a PDU session establishment request to the network node; and
receiving the PDU session establishment accept message responsive to the transmitting.

13. The method of claim 7, further comprising:
activating, by the processor, one or more user plane (UP) resources for the PDU session responsive to the received indication provided by the network node indicating the PDU session as an always-on PDU session when switching from an idle mode to a connected mode.

14. An apparatus, comprising:
a modem configured to wirelessly communicate with a network node of a wireless network; and
a processor coupled to the modem and configured to perform operations comprising:
establishing a protocol data unit (PDU) session between the modem and the network node responsive to a trigger by an application executed on the processor;
forwarding a query from the application to the modem for an indication provided by the network node on whether the established PDU session is an always-on PDU session; and
receiving the indication provided by the network node from the modem indicating whether or not the established PDU session is an always-on PDU session.

15. The apparatus of claim 14, wherein, in forwarding the query to the modem, the processor is configured to forward an AT command +CGCONTRDP to the modem.

16. The apparatus of claim 15, wherein, in receiving the indication provided by the network node from the modem, the processor is configured to receive from the modem a plurality of parameters in response to the AT command +CGCONTRDP, and wherein one of the plurality of parameters indicates whether the established PDU session is or is not an always-on PDU session as indicated by the network node.

17. The apparatus of claim 16, wherein the one of the plurality of parameters comprises <Always-on_ind>.

18. The apparatus of claim 16, wherein a value of 0 for the one of the plurality of parameters indicates that the established PDU session is not an always-on PDU session, and wherein a value of 1 for the one of the plurality of parameters indicates that the established PDU session is an always-on PDU session.

19. The apparatus of claim 14, wherein, in establishing the PDU session, the processor is configured to establish the PDU session responsive to the UE switching from an idle mode to a connected mode.

20. The apparatus of claim 14, wherein the processor is further configured to perform operations comprising:
activating one or more user plane (UP) resources for the established PDU session responsive to the received indication provided by the network node indicating the established PDU session as an always-on PDU session when switching from an idle mode to a connected mode.

* * * * *